United States Patent
Reudink et al.

(10) Patent No.: US 6,198,435 B1
(45) Date of Patent: *Mar. 6, 2001

(54) SYSTEM AND METHOD FOR IMPROVED TRUNKING EFFICIENCY THROUGH SECTOR OVERLAP

(75) Inventors: Douglas O. Reudink, Kirkland; Mark D. Reudink, Seattle, both of WA (US); Thomas W. Hammond, Peoria, IL (US); Scot D. Gordon, Seattle, WA (US); Sheldon K. Meredith, Duvall, WA (US); Curtis F. McClive, Redmond, WA (US)

(73) Assignee: Metawave Communications Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/280,307

(22) Filed: Mar. 29, 1999

Related U.S. Application Data

(63) Continuation-in-part of application No. 08/786,725, filed on Jan. 27, 1997, now Pat. No. 5,889,494.

(51) Int. Cl.[7] .............................. H01Q 3/22; H04Q 7/20; H04B 7/216
(52) U.S. Cl. .......................... 342/373; 455/443; 455/447; 370/335
(58) Field of Search .............................. 342/373; 455/443, 455/444; 370/334

(56) References Cited

U.S. PATENT DOCUMENTS 5,889,494 * 3/1999 Reudink et al. ..................... 342/373

FOREIGN PATENT DOCUMENTS

| 0639035 | 2/1995 | (EP) | ................................. H04Q/7/36 |
| 0725498 | 8/1996 | (EP) | ................................. H04B/7/04 |
| 0777400 | 6/1997 | (EP) | ................................. H04Q/7/36 |

* cited by examiner

*Primary Examiner*—Mark Hellner
(74) *Attorney, Agent, or Firm*—Fulbright & Jaworski L.L.P.

(57) ABSTRACT

A system and method are disclosed for improving trunking efficiency of a sectored cell by providing overlapping sectors. The disclosed invention teaches the use of multiple narrow beams composited to form a radiation pattern. Signals associated with each such narrow beam may be provided to inputs of a base station signal quality measuring device for assigning a mobile to a particular sector during call origination which inputs are associated with a particular sector of the radiation pattern. The number of narrow beam signals provided inputs associated with a particular sector defines the azimuthal width of that sector. By providing a same antenna beam signal to multiple sector inputs, overlapping sectors are defined.

36 Claims, 7 Drawing Sheets

SYSTEM AND METHOD FOR IMPROVED TRUNKING EFFICIENCY THROUGH SECTOR OVERLAP

REFERENCE TO RELATED APPLICATIONS

The present application is a continuation-in-part application of and commonly assigned U.S. patent application ANTENNA DEPLOYMENT SECTOR CELL SHAPING SYSTEM AND METHOD, Ser. No. 08/786,725 filed Jan. 27, 1997, now U.S. Pat. No. 5,889,494 the disclosure of which application is incorporated herein by reference.

Reference is hereby made to the following co-pending and commonly assigned U.S. patent applications: METHOD AND APPARATUS FOR IMPROVED CONTROL OVER CELLULAR SYSTEMS, Ser. No. 08/582,525 filed Jan. 3, 1996 now U.S. Pat. No. 5,884,147; ANTENNA DEPLOYMENT SECTOR CELL SHAPING SYSTEM AND METHOD, Ser. No. 08/924,285 filed Sep. 5, 1997 pending; and SYSTEM AND METHOD PROVIDING DELAYS FOR CDMA NULLING, Ser. No. 09/060,921 filed Apr. 15, 1998 pending; the disclosures of which applications are incorporated herein by reference.

TECHNICAL FIELD

This invention relates to cellular antenna systems and more particularly to systems and methods for providing improved trunking through the use of overlapping sectors such as may be formed through mapping antenna beams to form sectors.

BACKGROUND

As cellular communications become more widely used, the number of individual users and calls multiplies. Increase in cellular communications utilization magnifies the opportunity for interference between the different users on the cellular system. Such interference is inevitable because of the large number of users and the finite number of cellular communications cells (cells) and frequency bands (channels) available.

As originally implemented, cellular communications systems were broken down into omni-trunks where each cell was able to use each channel in a 360° radius. Because of overlap in the area serviced by cells, a caller utilizing one cell in the penumbra between two cells could interfere with a caller utilizing the other cell if both were on the same channel. To avoid this interference the channel utilized by a caller in one cell would have to be disabled for any other callers in any adjacent cells. Disabling such a channel on all adjacent cells would cause many more cells than actually utilized to have the caller's channel unavailable for use by other callers. Such disabling of channels to avoid interference was recognized to lead to under-utilization of cell resources as well as depletion of available channels.

In order to avoid such under-utilization, reuse patterns were adopted in the art wherein different channel sets are assigned to different cells so that callers in adjacent cells tend not to utilize the same channel concurrently. Problems with such reuse patterns, however, include difficulty in creating a cell reuse pattern utilizing channels in such a way as not to have any two cells' use of a channel overlap, as well as limitations on the number of channels available for use in implementing such a reuse pattern.

To reduce the interference problems caused by other users in the omni cell 360° configuration, cells have also been broken down into 120° sectors such that each channel available at the cell only communicates in an area of 120° radial coverage about the cell. An advantage, in addition to the reduction of interference realized by the sector system, is that such a cell achieves extended range as compared to an omni cell 360° system simply due to the ability to focus a greater signal gain on the antennas. Individual cells may then cover a larger area, and communications signals may be stronger within the cell.

A problem with going from the omni cell 360° configuration to the sector system, however, is that as a result of splitting of the cell into 120° sectors only a third of the channels are available in each sector. This results in a reduced call capacity, i.e., reduced trunking efficiency, in any particular cell sector at a cell as compared to that available in the omni cell 360° configuration. This is because if all of the channels in a particular sector are currently being utilized by subscriber units, a channel available in another sector in that same cell may not be available for utilization by a new caller located in the loaded sector. For example, if an omni cell has 60 channels and a sector system is divided into three 120° sectors, each sector only has 20 channels. If in sector 1 there are 20 channels being used and a twenty-first user attempts to gain access, this user will not have access to the cell because of a lack of available channels in the sector even if sectors 2 or 3 have available channels. Whereas, in the omni cell 360° configuration, provided that all 60 channels are not being utilized, the twenty-first user would have had access to the cell because all channels are by definition potentially available throughout the cell.

Trunking efficiency is a measure of the number of users which can be offered a particular grade of service with a particular configuration of fixed channels. As demonstrated above, the way in which channels are grouped can substantially alter the number of users handled by a trunked system.

Of course one solution to the increased blocked calls experienced due to decreased trunking efficiency might be to add to the total number of channels at the cell. However, this solution is undesirable in that the addition of channels further complicates establishing cell re-use patterns. Furthermore, as the number of channels per sector increases the possibility of interference events also increases. Likewise, the addition of channels increases the energy density within the cell and thus reduces the carrier to interference ratio which results in poorer signal quality.

It shall be appreciated that loading of sectors is often cyclic or dynamic in nature rather than constant. For example, during certain times of day, such as business commuting times, a particular sector, such as a sector encompassing an urban highway, may service more users than during other times of day. Therefore, during particular times a particular sector or sectors may require increased capacity in order to service all users whereas at other times the cell's capacity might be better utilized when spread more homogeneously throughout the cell's coverage area.

It would, therefore, be advantageous to make more efficient use of cellular capacity by being able to make sectors dynamically shapable in order to provide increased capacity to a particular area within the cell's radiation pattern by making more channels potentially available to that particular area, without actually increasing the total number of channels within the cell. Ideally, the shapable sectors will be composed of narrow beams so as to provide a convenient means by which sectors may be sized radially about the cell. Systems implementing such narrow beams are described in U.S. Pat. No. 5,563,610, entitled "NARROW BEAM ANTENNA SYSTEMS WITH ANGULAR DIVERSITY,"

incorporated herein by reference, and the associated continuation-in-part U.S. Pat. No. 5,643,968 entitled "NARROW BEAM ANTENNA SYSTEMS WITH ANGULAR DIVERSITY," also incorporated herein by reference. Management of such a system, including concurrent beam and channel management within a neighborhood of cells, is disclosed in U.S. Pat. No. 5,745,841 entitled "METHOD AND APPARATUS FOR IMPROVED CONTROL OVER CELLULAR SYSTEMS," incorporated herein by reference.

Another problem in the art is that in a cellular system, communications are typically mobile, often in vehicles traveling at considerable speed. Such mobile communication devices tend to travel through the various sectors and/or cells of a cellular system, thereby continuously effecting signal quality as fringe or shadow areas are entered and exited. These effects of signal quality are not limited to the mobile communication device itself, but also effect other communication devices operating in the area. For example, a communication device operating in one cell, although experiencing acceptable signal quality itself, may in fact be causing interference for another communication device. Such interference may be in the form of co-channel interference, near/far problems, increased energy density and the like. Therefore, it is desirable to provide a means by which such a communication device may be handed off to another sector or cell, although its communication parameters do not necessitate the hand off, in order to better serve another communication device. Likewise, such a communication device may be experiencing communication of a quality so as to be within acceptable parameters although communication of a better quality may be had through an adjacent sector or cell.

Recognizing the mobility of communications and the attendant communication quality issues, therefore, it would also be advantageous to be able to dynamically shape sectors in their longitudinal, or lengthwise, reach from a cell site. Preferably, as it is determined that a communication device is causing interference for another communication device or as it is determined that this communication device may itself be better served by another sector or cell, the shape of the sector currently serving the communication device may be adjusted to force a hand off of the communication device to another sector or cell. Ideally, the longitudinal shape of sectors will be accomplished through the use of attenuators in the receive signal path.

A need therefore exits in the art for a system and method for providing cell sectors adapted to provide for greater trunking efficiency and the ability to serve more users, such as through dynamically adjusting the shape of the sectors and/or providing for their overlap. Moreover, a need in the art exists for such a system to provide azimuthal as well as longitudinal shaping of the sectors.

SUMMARY OF THE INVENTION

The present invention preferably uses a multiple narrow beam antenna system to provide dynamically shapable sectors within a cell. By dynamically shaping the various sectors of a cell, problems of interference, such as co-channel interference or interference due to decreased carrier to noise ratio and the like, as well as channel depletion within a sector that attend the 3-sector system in wide use today may be addressed. Furthermore, through the use of sector shaping, the present invention provides the technical advantage of both increasing the number of users in a particular area which may be serviced by a cell as well as decreasing the interference to other cells.

Although any number of beams in any configuration may be used in accordance with the principles of the present invention, a preferred embodiment uses 12 such beams. In order to provide 360° coverage radially about the antenna system utilizing 12 beams, each beam is adapted to provide approximately 30° azimuthal coverage.

Dynamic assignment of beams to a particular sector within the cell results in the ability to adjust the sector's width, as referenced azimuthally. For example, assigning 2 of the aforementioned 30° beams to a sector provides a sector having a 60° radiation pattern. Likewise, assigning 6 of the aforementioned 30° beams to a sector provides a sector having a 180° radiation pattern.

It will thus be appreciated that channel depletion typical to the aforementioned 3 sector system may be addressed by the use of assignment or mapping of beams to sectors. Specifically, where 20 channels were available in a 120° sector of the prior art 3 sector system, the present invention may provide 40 channels within the same 120° coverage area by assigning 2 contiguous 30° beams each to 2 sectors.

Additionally, turning efficiency may be further improved over that of a typical sectored cell according to the present invention through the use of overlapping sectors. For example, by mapping 6 of the aforementioned 30° antenna beams as a single 180° sector and mapping 6 of the antenna beams as another 180° sector, where at least some of the antenna beams are common to each of the two sectors, overlapping sectors may be formed. As the channels of both sectors are available to subscriber units located within this overlapping sector area, trunking efficiency may be improved through the use of channel assignment algorithms which take into consideration available channels of each of the overlapping sectors.

By dynamically shaping sectors, the invention may open up the re-use of certain sectors during certain times of the day as utilization demands. Therefore, it will be appreciated that a technical advantage of the present invention is to provide for greater trunking efficiency and the ability to serve more users.

The assignment of beams to cell sectors of the present invention is preferably accomplished through the use of a switch matrix, or other means by which a signal path may be discontinued, associated with each beam. Each such means may be adjusted to provide a signal from its associated beam to any input of a base transceiver station (BTS) device that is responsible for assigning mobiles to channels with specific sectors.

Reference shall hereinafter be made to the base station channel assignment and control hardware or other call processing equipment, such as a signaling/scan Rx. It shall be understood that such reference includes both a scanning receiver or other circuitry which measures mobile communication parameters such as signal quality or RSSI or a call setup or initiation radio, both of which may be utilized according to the present invention. Moreover, as each of these devices typically need to cover the same area, it is anticipated that both such devices will be utilized according to the present invention. For example, if the signal strength measuring hardware is covering 60° in its first sector, then the channel assignment hardware also typically needs to cover 60° in its first sector. Therefore, it is expected that both devices will be utilized similarly according to the present invention.

It shall be understood that the scanning receiver searches out the mobiles that are within the coverage of the associated cell and is responsible for assigning those mobiles to a specific sector as are identified by inputs at the scanning receiver associated with each sector. Although utilizing both forward and reverse links, a similar function is performed by the call initialization, setup, or signaling radio. Therefore, through a combination of adjusting the individual signal paths associated with the various beams and combining signals provided to a common input of the call processing equipment, the shapable sectors of the present invention may be defined.

In a preferred embodiment of the present invention, attenuators are utilized to control signal amplitude as provided to inputs associated with the aforementioned call processing equipment. Such attenuators may be included between the output of switch matrixes used to adjust signal paths and the inputs to the call processing equipment, or may in fact replace the switch matrixes in providing the ability to discontinue the path of a particular signal to a particular input of the call processing equipment.

Regardless of the existence of the aforementioned switch matrixes, the attenuators may be utilized to adjust the magnitude of a signal provided to an input of the call processing equipment. Such adjusting results in the call processing equipment receiving a lower power signal than is actually received by the antenna system, and thus may be used to essentially manipulate the call processing equipment into handing off the communication to an adjacent sector or cell. Such artificially forced handing off of communications may be useful in providing capacity for another communication device in an otherwise full sector by handing off a communication device capable of communicating through an adjacent sector or cell. Similarly, the handing off may be useful in increasing signal quality by handing off a communication that, although the signal quality is within acceptable limits, is causing interference to another communication device or is itself experiencing poorer signal quality than would be available at an adjacent sector or cell.

Moreover, provision of the aforementioned attenuators results in a technical advantage in the ability to adjust the sector's effective outboard reach or length, as referenced in the direction of propagation of the radiation. It shall be appreciated that reduction of the size of the sector thereby decreases the amount of interference sent into adjacent cells as communication devices operating within the adjusted sector are limited in the distance from the center of the cell that they may operate. As a result, the adjacent cells may open up their sectors into larger areas to serve more customers, thus a system of cells utilizing the present invention may be used to provide increased signal quality as well as increased capacity without increasing the number channels available at each cell.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

The present invention provides a system and method for improving trunking efficiency through providing overlapping sectors and/or dynamically shaping sectors within a cell. Preferably, the sectors of the present invention are composed of narrow beams so as to provide a convenient means by which sectors may be sized azimuthally. Such multiple beams may be provided by either a single multi-beam antenna or a plurality of co-located discrete antennas.

Figure 1A:
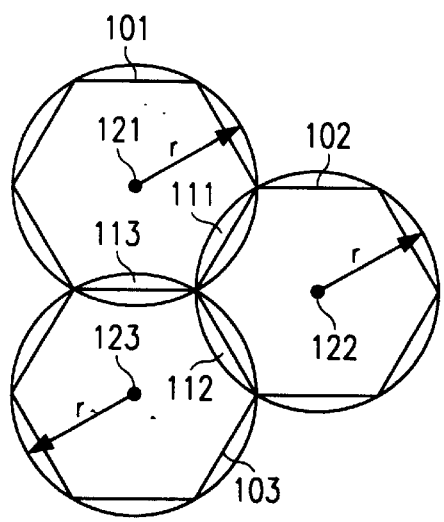
FIG. 1A illustrates a typical prior art omni-cell arrange.

To enable a better understanding of the advantages of the present invention, a brief description of some relevant prior art is included hereinafter. Directing attention to FIG. 1A, a typical prior art cellular pattern is illustrated by communications arrays 121 through 123 disposed to communicate in predefined areas, or "cells," illustrated as cells 101 through 103. These cells are omni trunk cell sites as any channel can be utilized in an entire 360° radius about the cell site.

As illustrated, a cell footprint is fixed by its forward channel radiated power, illustrated here as radius r. As can be seen by areas 111 through 113, there is some overlap between the radiation patterns of arrays 121 through 123 in order to provide the desired communication coverage within the cells.

The overlapping areas of communication coverage cause the potential for interference between communication devices operating within the cells. Therefore, to avoid interference, such as co-channel interference, when a communication device is operating on a particular channel of one cell, any adjacent cells must make that channel unavailable. It becomes readily apparent that the use of adjacent omni trunk cells providing communication on the same channels causes undesirable limitations on channel re-use and, therefore, communication capacity.

Figure 1B:
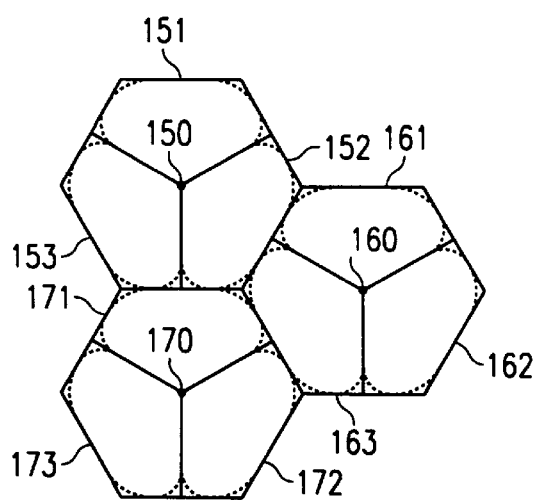
FIG. 1B illustrates a typical prior art sectored cell arrangement.

A prior art solution to this problem has been to implement a sectored cell arrangement as is illustrated in FIG. 1B. In this arrangement a single communication array provides communication in several defined sectors. For example, communications arrays 150, 160, and 170 are adapted to provide three discrete radiation patterns in predefined areas, or "sectors," illustrated as sectors 151 through 153, 161 through 163, and 171 through 173 respectively. The cells defined by this system are sector trunk cell sites wherein the available channels are divided among the sectors. Therefore, a given channel can be utilized only within one sector of the cell site. In the case of the three sectored system illustrated, channel use is limited to a 120° radius about the cell site.

Utilization of the sectored cell site provides for greater re-use of channels since the distance between cells using the same channels can be closer than in an omni configuration. However, it shall be appreciated that this greater channel re-use is at the cost of reduced channel availability in any particular sector. For example, where 60 channels are used in an omni trunk cell site, 60 channels are available at any point within the cell (provided of course a channel has not been made unavailable due to its simultaneous utilization at an adjacent cell site). Whereas, if 60 channels are used in a sector trunk cell site, these channels will be divided among the sectors, and only those channels associated with a particular sector will be available at any point within that sector. Of course, it shall be understood that the above discussion ignores the possibility of a communication device being positioned such that communication within multiple sectors or cells may be satisfactorily accomplished, in order to simplify the ideas being presented.

In implementing a three sector system, typically there is a scanning receiver or call setup radio coupled to the individual antenna elements providing directional coverage resulting in the sectored radiation pattern. The call processing equipment searches out the communication devices that are within the coverage of that cell site and assigns those devices to a specific sector, as identified at the call processing equipment by inputs associated with each sector. Generally, in a three sector system, such as illustrated in FIG. 1B, six inputs associated with the sectors are provided into the call processing equipment. There are two inputs per sector because generally there are two 120° antennas providing signal diversity on the receiver path per each sector.

Figure 2:
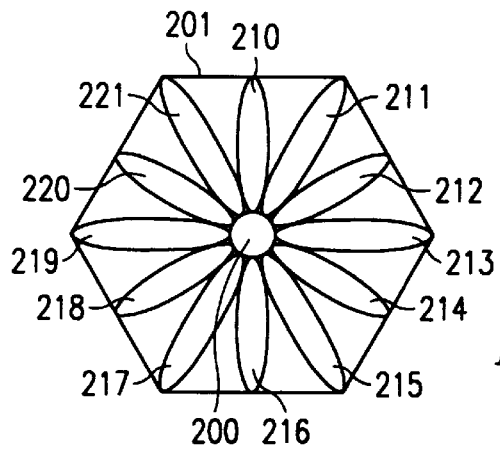
FIG. 2 illustrates a multi-beam cell utilized by the present invention.

Directing attention to FIG. 2, a multi-beam cell site utilized by the present invention is illustrated. Here 360° communication about cell site 200, and within cell 201, is accomplished by using multiple narrow beams illustrated as beams 210 through 221. Systems implementing such narrow beams are described in U.S. Pat. No. 5,563,610, entitled "NARROW BEAM ANTENNA SYSTEMS WITH ANGULAR DIVERSITY," and the associated continuation-in-part U.S. Pat. No. 5,648,968 entitled "NARROW BEAM ANTENNA SYSTEMS WITH ANGULAR DIVERSITY," both of which have been previously incorporated herein by reference.

It shall be appreciated that, although a preferred embodiment includes twelve narrow beams, any number of beams in any orientation and configuration may be utilized according to the present invention. Of course, the number of beams, and thus their azimuthal width, utilized by the system will directly impact the minimum width of a shapable sector achievable by the present invention.

Taking for example the preferred embodiment wherein a twelve beam system is used, the azimuthal width of a single sector can be reduced to 60° where a call processing equipment having two inputs per sector is used. This sector size is accomplished by feeding two substantially non-overlapping 30° beams, instead of the signal provided by two substantially overlapping 120° antennas of the prior art, into the call processing equipment for this particular sector. The same azimuthal width might also be selected for a second sector, leaving the third sector having a width of 240°.

Of course, the azimuthal width of a single sector may be reduced to 30° where a single 30° beam is fed into the sector input of a call processing equipment. However, the advantages of signal diversity are not realized in such a sector. Therefore, the preferred embodiment of the present invention utilizes at least two beams per sector.

It shall be appreciated that by establishing two 60° sectors, the present invention is able to provide the total number of channels available in two sectors within the same area as a single 120° sector of the prior art. For example, where 60 channels are divided evenly among three sectors, which is a typical case of the above discussed prior art three sector system, each sector might have 20 channels associated therewith. Therefore, the 120° azimuthal width associated with the two 60° sectors of the present invention would have a total of 40 channels available therein, as opposed to the 20 channels available in the 120° sector of the prior art.

Similarly, it is also possible to combine signals from the same beams into sector inputs of two or more sectors to provide overlapping sectors of various sizes. For example, in the twelve beam system shown in FIG. 2, signals from six of the beams, i.e., beams 210–215, could be provided to inputs associated with the first two sectors of the call processing equipment and the remaining six beams, beams 216–221, to the input of a third sector. Here, instead of having 120° per sector as in the prior art, each sector covers 180°; the first and second sector providing 180° overlapping coverage and the third sector providing coverage for the remaining 180°. Accordingly, the channel of two sectors are available throughout one of the 180° areas defined.

Likewise, overlapping sectors may be defined, for example, by providing signals from eight of the beams, i.e., beams 210–217 to inputs associated with a first ($\alpha$) sector, signals from eight of the beams, i.e., beams 214–221 to inputs associated with a second ($\beta$) sector, and signals from eight of the beams, i.e., beams 210–213 and 218–221 to inputs associated with a third ($\gamma$) sector. Here, each sector covers 240° and the orientation of each sector is such that there are areas of overlap between the sectors, i.e., the first and second sectors overlap at beams 214–217, the second and third sectors overlap at beams 218–221, and the first and third sectors overlap at beams 210–213. Accordingly, the channels ($N_\alpha$, $N_\beta$, $N_\gamma$) of each of the overlapping sectors are available to subscriber units in these areas of overlap, i.e., channels $N_\alpha$ and $N_\beta$ are available in the area serviced by beams 214–217.

It shall be appreciated that the doubling of the number of available channels in a particular area of the cell does not necessarily double the trunking efficiency, but actually increases the trunking efficiency in a non-linear relationship.

The traffic intensity offered in each region of the cell is a probabilistic quantity which may be defined as $p_x\lambda$ where $p_x$ is the probability that a call originates from region x and $\lambda$ is the traffic intensity offered to the cell in Erlangs. The blocking probability, or grade of service (GOS), of a N channel system may be expressed using the Erlang B formula:

$$P_E(\lambda, N) = \frac{\lambda^N/N!}{\sum_{k=0}^{N} \lambda^k/k!}$$

This equation is exact (provided the assumptions in its derivation hold) where there is no sector overlap. However, as the sectors begin to overlap the channel sets become coupled and there are no longer independent sets of channels. The state of one set of channels effects the state of the other channels. Accordingly, instead of a simple one dimensional Markov chain, a multi-dimensional Markov chain with the number of states equal to the product of one plus the number of channels in each sector (i.e., $N_\alpha+1$, $N_\beta+1$, $N_\gamma+1$).

However, approximations may be used to simplify the understanding of the blocking probabilities associated with the overlapping sectors of the present invention. Specifically, any subscriber unit that is in a region of no overlap sees only a single channel set, $N_i$, and thus experiences an approximate blocking probability, $P_E(\lambda_i, N_i)$. Any traffic that is in a region of two sector overlap sees a total of $N_i+N_j$ channels, and thus experiences an approximate blocking probability of $P_E(\lambda_i+\lambda_j, N_i+N_j)$. Any traffic that is in a region of three sector overlap sees a total of $N_\alpha+N_\beta+N_\gamma$ channels, and thus experiences an approximate blocking probability of, $P_E(\lambda, N)$. Accordingly the seven conditional probabilities maybe computed from:

$$Pr(\text{Blocked} \mid \text{In region } i) \geq \begin{cases} P_E(\lambda_\alpha, N_\alpha) & i = \alpha \\ P_E(\lambda_\beta, N_\beta) & i = \beta \\ P_E(\lambda_\gamma, N_\gamma) & i = \gamma \\ P_E(\lambda_\alpha+\lambda_\beta, N_\alpha+N_\beta) & i = \alpha\beta \\ P_E(\lambda_\beta+\lambda_\gamma, N_\beta+N_\gamma) & i = \beta\gamma \\ P_E(\lambda_\alpha+\lambda_\gamma, N_\alpha+N_\gamma) & i = \alpha\gamma \\ P_E(\lambda, N_\alpha+N_\beta+N_\gamma) & i = \alpha\beta\gamma \end{cases}$$

Accordingly, in a N channel system, if the traffic is equally distributed among the sectors, then the blocking probability associated with overlapping sectors each providing an equal number of channels is likely to be less than half the blocking probability associated with a single sector. Stated in the inverse, the capacity, and thus the trunking efficiency of the overlapping sectors is likely to be greater than twice that of a single sector.

It should be appreciated that, although described above with respect to sectors of equal azimuthal size, the present invention is not so limited. Likewise, the present invention is not limited to the mapping of any particular number of beams to a particular overlapping sector, but rather may include any number of total antenna beams, any number of which overlap with other sectors. Furthermore, the present invention may include overlapping sectors formed from non-contiguous antenna beams, such as a first sector and a second sector including overlapping use of a particular antenna beam where the remainder of either sector's antenna beams are not co-located, if desired.

Where subscriber units desire to establish communication, such as call origination and/or handoff considerations, within an area serviced by more than one sector, i.e., an overlapping sector region, there is preferably an arbitration scheme to assign the communication to a particular sector, i.e., a particular channel associated. For example, a call originating in an area serviced by multiple sectors may be assigned to the sector with the highest RSSI for that subscriber unit. Likewise, hand-ins to an area serviced by multiple sectors may be assigned to the sector with the highest RSSI. Handoffs may follow normal guidelines for a sector site.

Alternatively, an arbitration scheme where calls in regions of sector overlap may be allocated randomly with equal probability so that either of the two possible sectors may be used. Here, if the selected sector is blocked the arbitration scheme may attempt to allocate the call to the remaining sector. If this sector is blocked the call may then be considered to be blocked. Traffic in regions of three sector overlap may be allocated randomly with equal probability to one of the three possible sectors. If the selected sector is blocked, the arbitration scheme selects randomly with equal probability between the two remaining sectors. If this selected sector is blocked then the call may be considered to be blocked. Alternatively, if this second selected sector is blocked the arbitration scheme may attempt the final sector, which if blocked, causes the call to be considered blocked. In this way, omni trunking efficiency may be approached when the three sectors are configured to overlap.

Figure 3A:
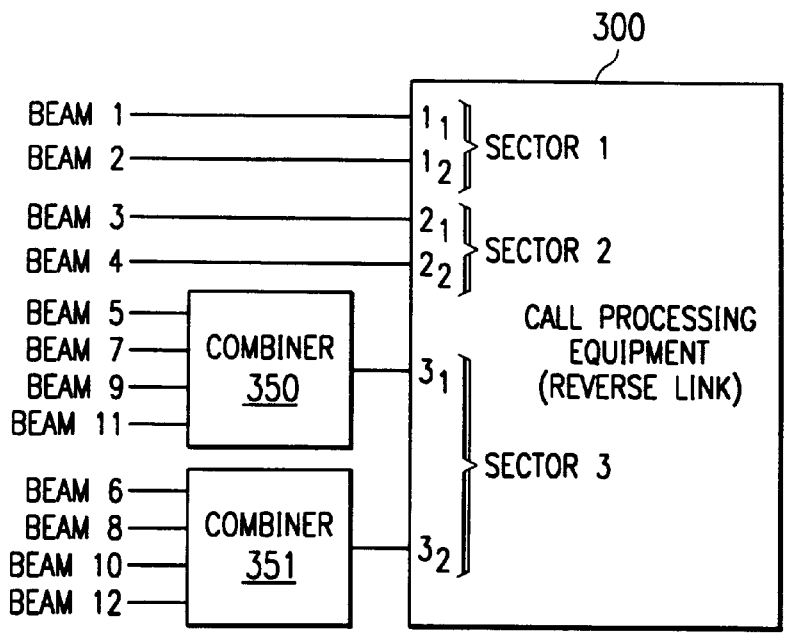
FIG. 3A illustrates a block diagram of a communication system wherein multiple beams are combined to provide various sector sizes according to the present invention.

FIG. 3A illustrates an implementation resulting in the above described three sector system having two 60° sectors and one 240° sector. With reference to FIG. 3A, call processing equipment 300 is a typical prior art scanning receiver or call setup radio having two inputs per sector. Here the inputs associated with a first sector are identified as inputs $1_1$ and $1_2$. Likewise, the inputs associated with a second and third sector are identified as inputs $2_1$ and $2_2$ and $3_1$ and $3_2$ respectively. Therefore, where beams 1 though 12 are associated with a 12 beam system, wherein each beam has a 30° azimuthal width such as illustrated in FIG. 2, the sector sizing is as described above. Specifically, sector 1 having a 30° beam 1 and a 30° beam 2 associated with inputs $1_1$ and $1_2$ provides a 60° sector. Similarly, sector 2 having a 30° beam 3 and a 30° beam 4 associated with inputs $2_1$ and $2_2$ provides a 60° sector.

As call processing equipment 300 only provides two inputs per sector, additional circuitry is necessary in order to input the plurality of beams remaining as a third sector. In a preferred embodiment, signal combiners 350 and 351 are utilized to combine the signals provided by the remaining beams of the system into the proper number of discrete signals suitable for input into the call processing equipment utilized by the present invention.

Through the use of signal combiners, sector sizing is accomplished by summing together the beam signals so as to increase the size of the sector signal provided to the call processing equipment. In a preferred embodiment, where such combining of antenna beam signals results in undesired nulling, delays may be introduced into ones of the signal paths to eliminate nulls due to cancellation. Systems implementing such delays are described in the above-referenced co-pending and commonly assigned U.S. patent application entitled "SYSTEM AND METHOD PROVIDING DELAYS FOR CDMA NULLING". Of course, where a call processing equipment having a sufficient number of inputs to accommodate such a plurality of signals is utilized, the use of additional circuitry, such as combiners 350 and 351, may be eliminated, if desired. Likewise, the use of circuitry other than signal combiners, such as multiplexers, may be utilized according to the present invention, if desired. However, it shall be appreciated that the signal combiners are utilized in the preferred embodiment as signals from the various combined beams are provided to the call processing equipment simultaneously, providing simultaneous communication throughout the beams of the sector, rather than in time division multiple access (TDMA) format as is the case in the use of a typical multiplexer. Of course, where TDMA signals or multiplexing by other schemes, such as frequency division multiple access (FDMA), are acceptable, multiplexers may replace the signal combiners of the preferred embodiment.

Because the call setup radio utilizes both forward and reverse links, circuitry providing forward link sector sizing consistent with that of the reverse link discussed above may also be provided. For example, where the call setup radio utilizes different signaling channels per sector, the circuitry illustrated in FIG. 3B may be utilized to transmit these signaling channels within the same sectors as those of the reverse link illustrated in FIG. 3A.

Figure 3B:
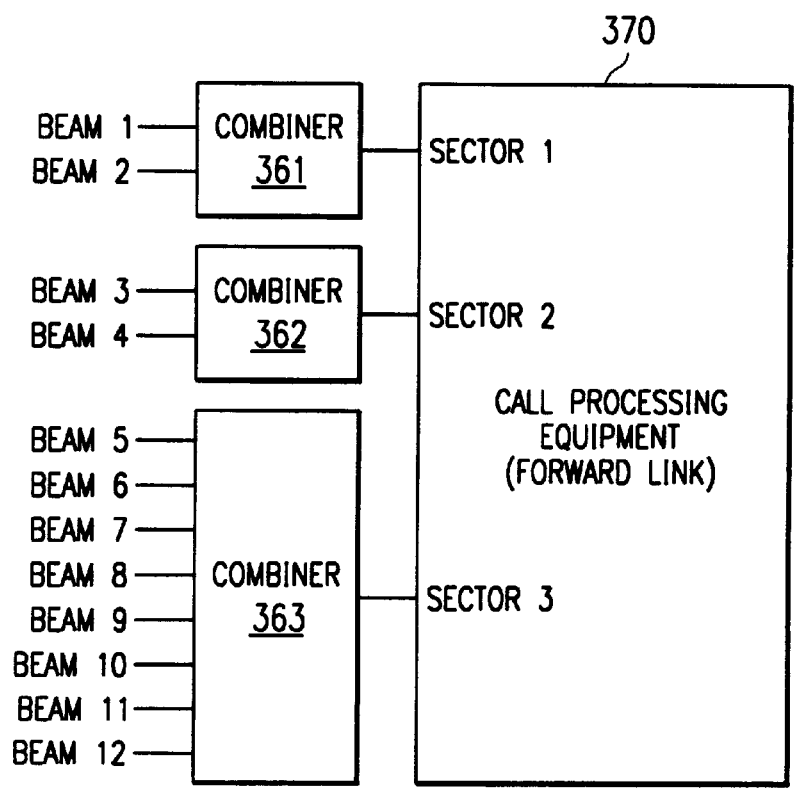
FIG. 3B illustrates a block diagram of the combining of multiple beams for the forward link of call processing equipment to match the various sector sizes of the system illustrated in FIG. 3A.

It shall be appreciated that the circuitry of FIG. 3B is substantially the same as that of FIG. 3A. However, as typical prior art call setup radios generally have only one output per sector, all beams associated with a particular sector are coupled to this output. For example, the three sector outputs of call setup radio 370 illustrated in FIG. 3B each include combiners to provide an output signal to sectors including the same number of beams as the reverse link illustrated in FIG. 3A. Specifically, combiners 361 and 362 provide signals to beams 1 and 2, and 3 and 4 respectively. Likewise, combiner 363 provides signals to beams 5 through 12.

It shall be appreciated that the system illustrated in FIG. 3A establishes two adjacent 60° sectors and is, therefore, able to provide the total number of channels available in two sectors in the same area as a single prior art 120° sector. Using the previous example where 60 available channels are divided evenly among the three sectors, each sector would have 20 channels associated therewith. Therefore, the capacity provided by the combination of sectors 1 and 2 sectors is a total of 40 channels within the associated 120° azimuthal width, rather than the 20 channels available in the single 120° sector of the prior art.

Of course, the above mentioned increase of channel density within the 120° area of interest is at the expense of available channels in the remainder of the cell. In the above example only 20 channels of the 60 total channels would remain available in the remaining 240° sector. However, it shall be appreciated that such a system is advantageous where the users of a particular cell are more heavily concentrated within a particular area within the cell rather than evenly distributed throughout. Such usage patterns may be experienced, for example, where a cell is located to include a commuter highway in its radiation pattern, or is located on the edge of a metropolitan area. Such cells might experience heavy user densities in particular areas as the user population commutes to and from work.

It shall be appreciated that the increased number of channels described above may be accomplished without diminishing the number of available channels in the remainder of the cell through the use of overlapping sectors.

Figure 3C:
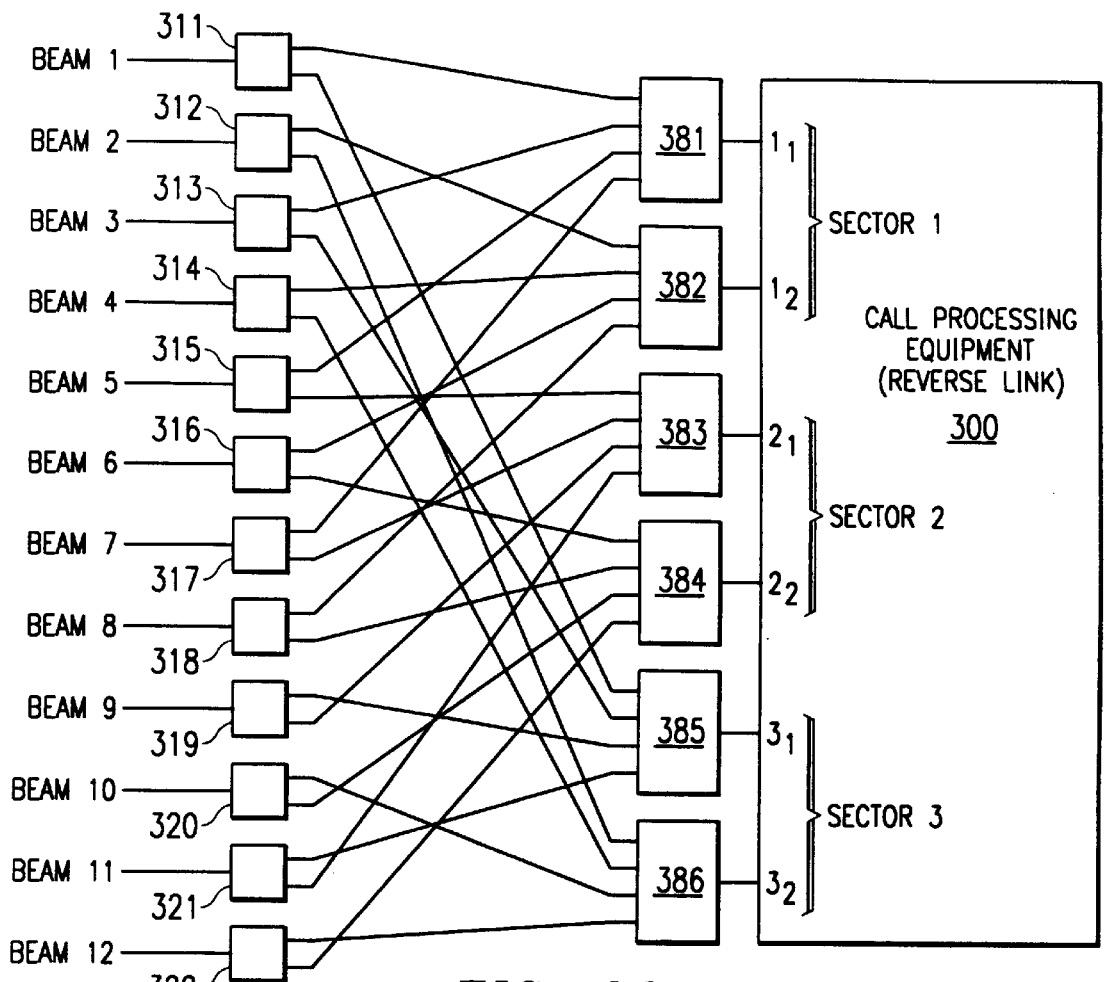
FIG. 3C illustrates a block diagram of the combining of multiple beams to provide overlapping sectors according to the present invention.

FIG. 3C illustrates an implementation resulting in the above described three overlapping sector system having three 240° sectors. As with reference to FIG. 3A, call processing equipment 300 is a typical prior art scanning receiver or call setup radio having two inputs per sector. Where beams 1 though 12 are associated with a 12 beam system, wherein each beam has a 30° azimuthal width such as illustrated in FIG. 2. Accordingly, sector 1 has four 30° beams (beams 1, 3, 5, and 7) associated with input $1_1$ and four 30° beams (beams 2, 4, 6, and 8) associated with input $1_2$ and provides a 240° sector. Similarly, sector 2 having four 30° beams (beams 5, 7, 9, and 11) associated with input $2_1$ and four 30° beams (beams 6, 8, 10, and 12) associated with input $2_2$ provides a 240° sector which overlaps sector 1 at beams 5–8. Sector 3 having four 30° beams (beams 1, 3, 9, and 11, )associated with input $3_1$ and four 30° beams (beams 2, 4, 10, and 12) associated with input $3_2$ provides a 240° sector which overlaps sector 1 at beams 1–4 and sector 2 at beams 9–12.

As call processing equipment 300 only provides two inputs per sector, circuitry is necessary in order to input the plurality of beams in establishing the multiple beam sectors. Likewise, as the antenna beams are provided to multiple sectors in order to provide the overlapping sectors, circuitry is necessary to couple the antenna beams to multiple sector inputs. In a preferred embodiment, signal splitters 311–322 are utilized to split the antenna beam signals for coupling with multiple ones of the sector inputs. Similarly, combiners 381–386 are utilized to combine the signals provided by multiple ones of the antenna beams for provision to sector inputs. Additionally, as discussed above, because the call setup radio utilizes both forward and reverse links, circuitry providing forward link sector sizing and overlap consistent with that of the reverse link discussed above may also be provided.

It shall be appreciated, the above described overlapping sectors increases the number of channels available within each 240° sector by a factor of two. Accordingly, at any point within the cell defined by the above overlapping sectors, 40 of the 60 total channels (20 from each of the overlapping sectors) would be available to service calls. However, the directionality, i.e., pointing angles, of the sectors has been retained in order to provide greater channel reuse throughout the network, as compared to an omni trunk system. It shall be appreciated that such a system is advantageous in increasing the trunking efficiency as when the channels of a particular sector are all in use, rather than being blocked, a subsequent caller may make use of a channel of an overlapping sector. Moreover, such overlapping need not be homogeneous as illustrated, but instead may be disposed to serve predicted or observed loading patterns. For example, where the users of a particular cell are more heavily concentrated within a particular area within the cell rather than evenly distributed throughout, this area may be provided with service from overlapping sectors, and thus their combined channels, without substantially affecting the reuse of such channels throughout the cellular network.

It shall be appreciated from the above discussion, that usage patterns which may advantageously be addressed by the present invention may change at various times of the day or week. For example, the previously described cell overlapping a commuter highway may see heavy utilization in a particular area during worker commuting times, and a more evenly distributed utilization pattern at other times. Similarly, a cell placed at the edge of a metropolitan area may see heavy utilization in an area encompassing the metropolitan area during working hours and heavy utilization in an area outside the metropolitan area during non-working hours. Therefore, it becomes obvious that further advantage may be realized by the system of the present invention by providing means by which the sizable sectors may be dynamically adjusted to accommodate the varying utilization patterns of a cell.

Figure 3D:
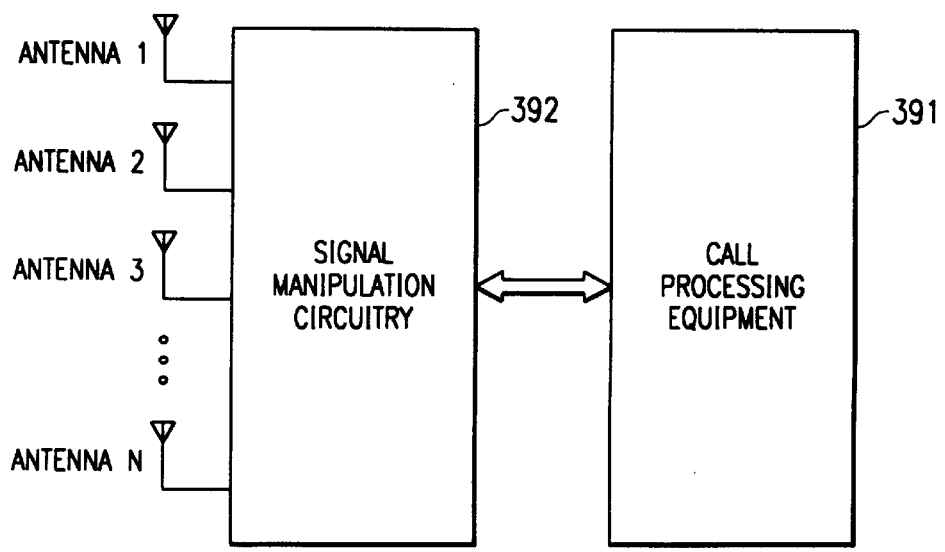
FIG. 3D shows a high level block diagram of a system according to the present invention.

FIG. 3D shows a high level block diagram of a system adapted to dynamically adjust sectors or radiation patterns of a communication system. The signals associated with antennas 1–N are dynamically manipulated, such as by phase adjustment, amplitude adjustment, combining, and/or discontinuing, by signal manipulation circuitry 392 for coupling to/from call processing equipment 391. In addition, the signal levels may be manipulated by altering the messaging between the cell site measurement or processing equipment and the cell site control equipment. Accordingly, signal manipulation circuitry 392 may include a processor based system or other controller operable to control attenuators, phase shifters, switch matrixes and/or the like in order to provide desired radiation patterns, such as in response to measured parameters, or through reference to a centralized operations center or the like.

Figure 4:
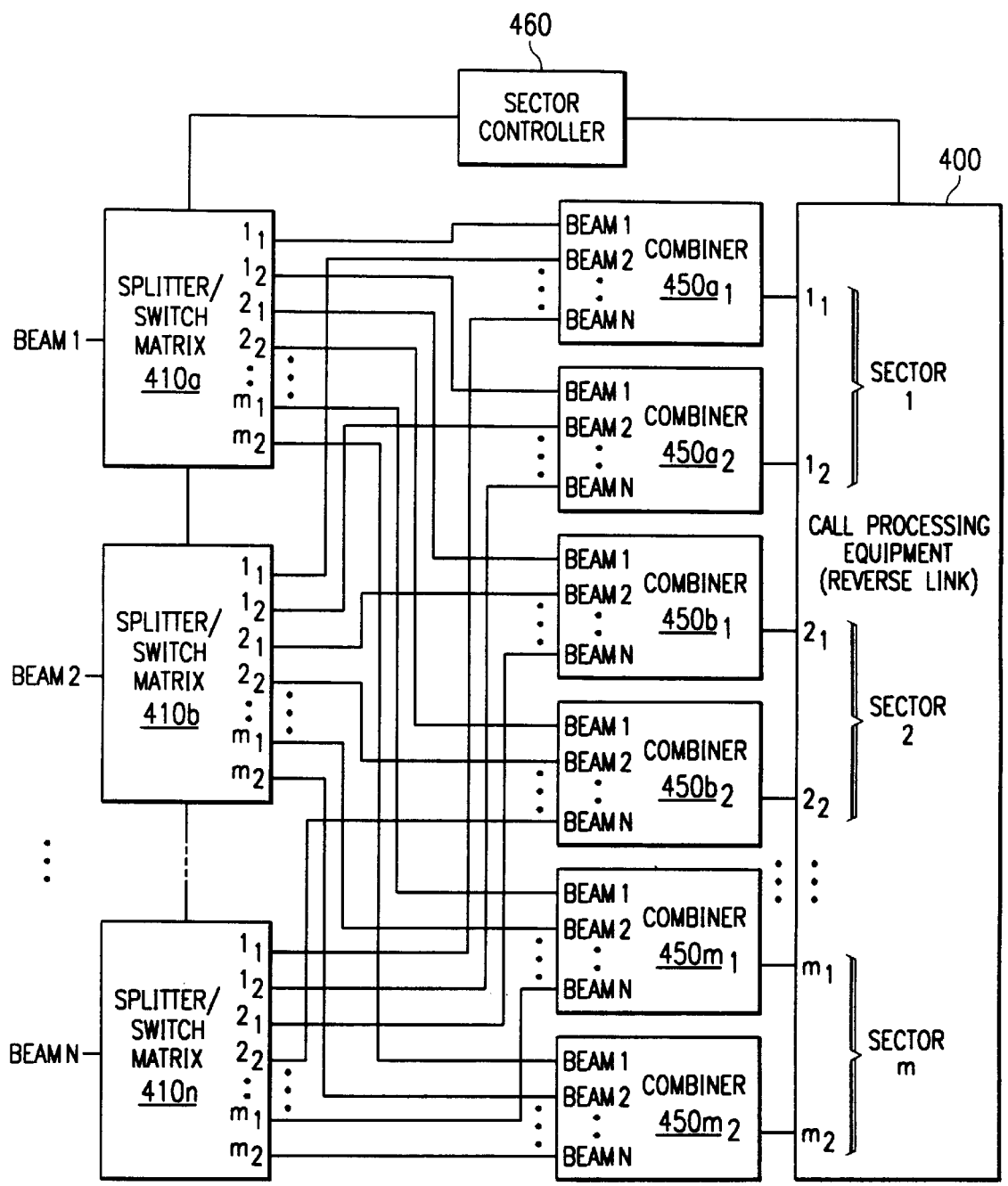
FIG. 4 illustrates a block diagram of a communication system wherein multiple beams are dynamically combined to provide selectable sector sizes according to the present invention.

FIG. 4 illustrates a preferred embodiment of the interface of signals from the various beams of a multi-beam system into a call setup radio, or scanning receiver, enabling a flexible sector/cell system of the present invention. Here, as in the system illustrated in FIGS. 3A and 3C described above, signal combiners are provided to allow the input of multiple beams into the sector inputs of call processing equipment 400 having M sectors. However, it shall be appreciated that, in order to provide for the input of a signal associated with any beam to any sector input, a signal combiner, illustrated as combiners $450a_1$, $450a_2$, $450b_1$, $450b_2$, $450m_1$, and $450m_2$, is associated with each sector input of call processing equipment 400.

Furthermore, in order to provide a signal at any combination of the above described combiners, and thus the associated sector input of call processing equipment 400 (i.e., providing the same signal at a plurality of sector inputs simultaneously as described above with respect to FIG. 3C), signals from the N beams are provided to splitter/switch matrixes associated with each beam; illustrated here as splitter/switch matrix 410a, 410b, and 410n. It shall be appreciated that each splitter/switch matrix splits the signal of an associated beam so as to be available for switchable connection to any combination of the aforementioned combiners. For example, the signal associated with beam 1 may be split M ways (so as to be available for input to call processing equipment inputs associated with each of the M sectors) and be switchably connected to any combination of combiners by splitter/switch matrix 410a.

Of course, the function of the disclosed splitter/switch matrixes may be accomplished by utilizing a separate splitter in combination with a switch matrix having the proper number of inputs and outputs to provide for the switching of a signal associated with a beam to any combination of combiners. Moreover, signal amplification circuitry may be included in, or in addition to, the splitter circuitry of the preferred embodiment to provide a split signal having an acceptable magnitude. Such signal amplification may be provided in order to present each signal component of the original signal at a power level, or magnitude, substantially the same as the signal prior to its being split. Likewise, such signal amplification may be to present a split signal having a sufficient power level, or magnitude, to provide an acceptable signal to noise ratio. Where the original signal is split to provide a large number of split signal components, such amplification may be necessary in order to provide a signal having an acceptable signal to noise ratio to the inputs of call processing equipment 400.

Of course, where it is not desired to provide the signal associated with a particular beam to more than one signal combiner, and thus its associated sector input, the splitter/switch matrixes of the present invention may omit the functionality of signal splitting, if desired. However, it shall be understood that omission of signal splitting, or a similar method of provision of multiple instances of the same signal information, is at the cost of the ability to provide overlapping coverage by the various sectors as is discussed herein below.

Additionally, where it is not desired to allow for the input of a signal associated with each beam of the system to all sector inputs of the call processing equipment, the number of outputs of the splitter/switch matrixes, as well as their associated combiner inputs, may be less than the total number of beams. However, it shall be appreciated that such a system is limited in ability to size a sector as the sector size is a function of the beam width and number of beams combined into a sector input.

By properly adjusting the splitter/switch matrixes of the present invention, various predetermined sector sizes may be realized. For example, the aforementioned combination of two 60° sectors and a single 240° sector may be realized in the following manner. By adjusting splitter/switch matrix 410a, the signal of beam 1 may be provided exclusively to combiner $450a_1$ associated with a first input of sector 1. Likewise, by adjusting splitter/switch matrix 410b, the signal of beam 2 may be provided exclusively to combiner $450a_2$ associated with a second input of sector 1. By similarly adjusting a second pair of splitter/switch matrixes (not shown, but represented by the ellipsis between splitter/switch matrixes 410b and 410n), associated with a third and fourth beam (not shown, but represented by the ellipsis between beams 2 and N), a second 60° sector may be defined. Similarly, adjusting an additional eight splitter/switch matrixes, associated with, a remaining eight beams of a twelve beam system, such as that illustrated in FIG. 2, a third 240° sector may be defined. However, in this third sector, it shall be appreciated that adjusting of the remaining eight splitter/switch matrixes results in a combination of four beam signals switched to each of the two combiners associated with the third sector; illustrated here as combiners $450m_1$ and $450m_2$.

It shall be appreciated that the aforementioned arrangement has established a system wherein two 60° sectors and a single 240° sector, as described above with reference to FIG. 3A. However, it shall be appreciated that the splitter/switch matrixes of the embodiment illustrated in FIG. 4, may be adjusted to provide sectors of sizes different than those describe above.

For example, using every other beam of the first six beams for input number 1 and the remaining beams of this six for input number 2 associated with a first sector, this first sector now covers 180° about the cell site. Likewise, using every other beam of the first six beams for input number 1 and the remaining beams of this six for input number 2 associated with a second sector, this second sector also covers the same 180° about the cell site as the first sector. Coverage for the remaining 180° may be provided by using every other beam of the last six beams for input number 1 and the remaining beams of this six for input number 2 associated with a third sector.

Such overlapping sector configurations provide the channels associated with each overlapping sector throughout the area of overlap. The provision of overlapping sectors, and thus increasing the number of channels available in the areas of overlap, will be described in more detail with reference to FIG. 7 below.

Selection of the size of the various sectors of the present invention may be made by manually adjusting the splitter/ switch matrixes. Such manual adjustment may be acceptable where, for example sector sizes are rarely, if ever, changed. However, as discussed above, it is envisioned that the sectors of the present invention will advantageously be adjusted depending on different utilization patterns throughout any given day or week. Therefore, in a preferred embodiment, a control signal is provided to adjust splitter/switch matrixes 410a through 410n in order to dynamically select sector sizes.

Referring to FIG. 4, a control signal is provided each splitter/switch matrix by sector controller 460. It shall be understood that, although a single control interface is illustrated between all of the splitter/switch matrixes, each of these splitter/switch matrixes may be controlled independently by controller 460. Of course, sector controller 460 need not be a discrete component associated with the cell site, but may instead be an integral part of the cell's existing control circuitry. Moreover, sector controller 460 may be included as a part of a centralized control system, utilized to control a network of neighboring cell sites, rather than being embodied within the particular cell site it is associated with.

Sector controller 460 may comprise a processor-based system having a processing unit (CPU) and memory associated therewith (RAM). The RAM may have stored therein an algorithm operable to cause the CPU to adjust the splitter/switch matrixes of the present invention to switchably connect the signals of the various beams to predetermined ones of the sector inputs at various times of the day or week. Such an algorithm may be based on past or projected utilization patterns and incorporate no information on the actual utilization pattern of the cell.

Alternatively, as utilization patterns are often unpredictable and subject to change unexpectedly, in a preferred embodiment, sector controller 460 includes current utilization information, such as may be determined by controller 460 or may be provided by the cell's existing control circuitry. This current utilization information may include such information as the number of users associated with particular sectors, the number of available channels, or other resources, of particular sectors, or the signal quality associated with particular sectors or particular users within the sectors. From this information, sector controller 460 may adjust the splitter/switch matrixes of the present invention to provide alternative sector sizing and thus increase the number of channels, or other resources, available to a particular area within the cell, or improve signal quality associated with a sector or user.

Additionally, or in the alternative, sector controller 460 may be provided with current utilization information from a centralized apparatus (not shown) controlling a plurality of neighboring cells. Such a centralized apparatus may be provided information from each of the neighboring cells in order to make decisions as to the allocation of the various resources of the system, such as the re-use of channels at neighboring cells, the handing off of users between the cells, and the sizing of sectors at neighboring cells to provide increased capacity or signal quality. Management of such a system within a neighborhood of cells is disclosed in the above referenced co-pending and commonly assigned U.S. patent application entitled "METHOD AND APPARATUS FOR IMPROVED CONTROL OVER CELLULAR SYSTEMS."

It shall be appreciated that, as discussed above, communication within a particular sector of a cell of a cellular system is not only a function of other communications within that sector or even other sectors of that cell, but may also be affected by communications within neighboring cells. Therefore, an alternative embodiment of the present invention includes means by which to adjust the sector's effective outboard reach or length, as referenced in the direction of propagation of the radiation. It shall be appreciated that reduction of the longitudinal size of the sector thereby decreases the amount of interference sent into adjacent cells as communication devices operating within the adjusted sector are limited in the distance from the center of the cell that they may operate. As a result, the adjacent cells may open up their sectors into larger areas to serve more customers. Thus, a system of cells utilizing the present invention may be used to provide increased signal quality as well as increased capacity without increasing the number channels available at each cell.

The above mentioned sector outboard shaping may be accomplished by putting attenuators shown and described in further detail with reference to FIG. 5 in the signal path between an antenna element associated with a particular beam and the signal's input into the call processing equipment, such as between each output of splitter/switch matrix 410a and the associated inputs of combiners $450a_1$ through $450m_2$. Such attenuators may be utilized to adjust the power of a received signal prior to its input into the call processing equipment. Therefore, the call processing equipment may be convinced that a particular beam is providing a lower input signal strength than is actually being received. As such, the call processing equipment can be artificially manipulated to either cause an in sector hand off or a hand off to another cell.

It shall be appreciated that, since the cell site scanning receiver typically receives a control signal from the cell site telling it which voice channel to scan, it is possible to switch only the two beams having the strongest signal on this channel to the scanning receiver to accomplish the above described advantages and functions. Likewise, the call setup radio can be operated in a similar manner in the reverse link. For the call setup radio a signal detector may be used to determine the beams having the strongest reception of the control channel signal and then only those beams need be switched to the call setup radio. This allows the cell to control which sector a call originates on, and therefore the sector size, depending upon which port of the call setup radio the beams are routed to.

Figure 6:
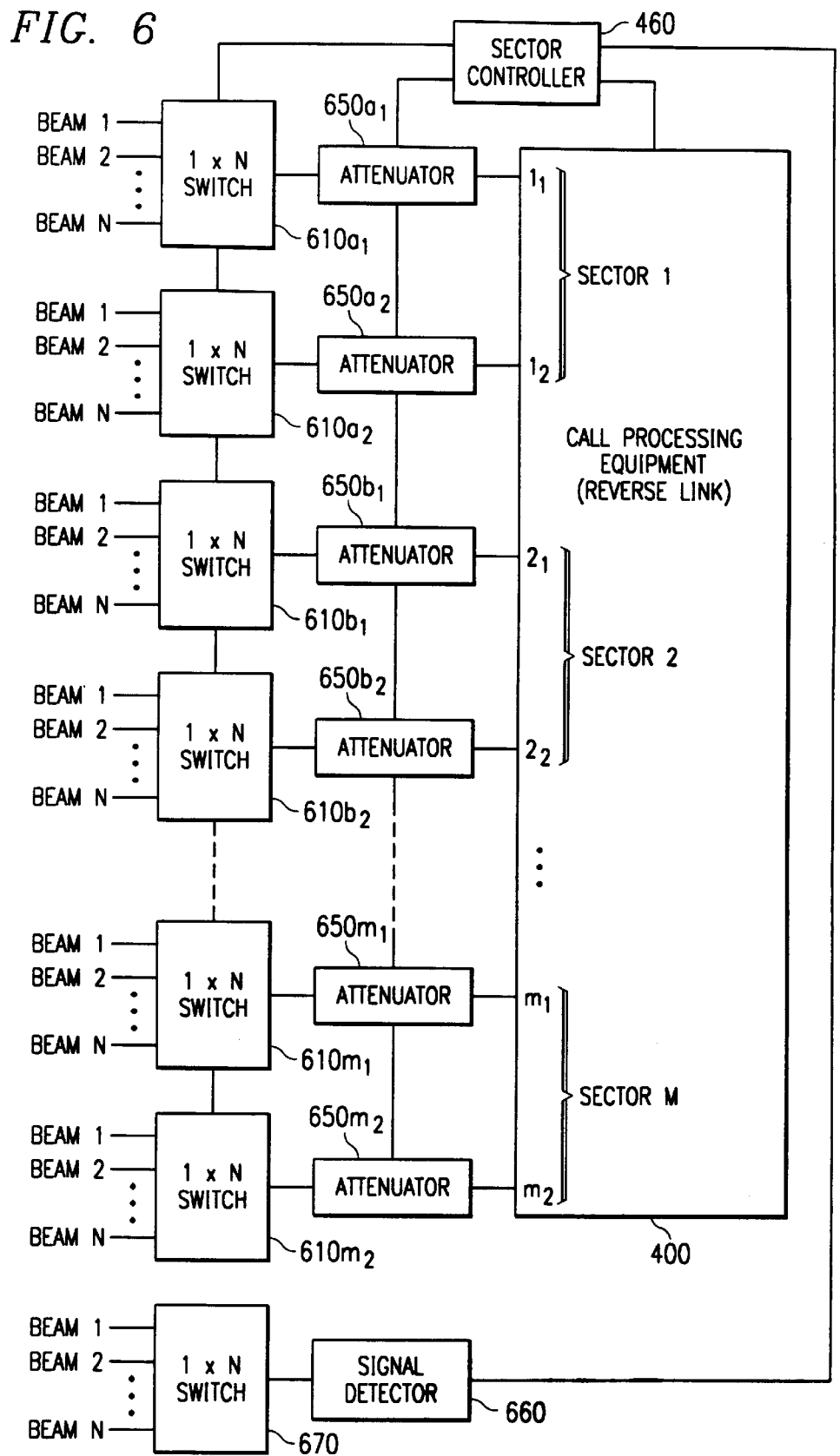
FIG. 6 illustrates a block diagram of a communication system wherein particular signals of interest may be dynamically routed and attenuated to provide selectable sector sizing according to the present invention.

Directing attention to FIG. 6, an alternative embodiment of the present invention is illustrated suitable for providing the signals of the two beams receiving the strongest signal of interest, i.e., the signaling control channel or a particular voice channel, to call processing equipment 400. It shall be appreciated that this embodiment does not utilize combiners $450a_1$ through $450m_2$ as only the beams having the strongest received signal of interest will be switched to a particular input of call processing equipment 400.

Because only the beams having the strongest receive signal of interest are switched to the input of call processing equipment 400, the number of switch matrixes utilized in this embodiment is associated with the number of sector inputs of call processing equipment 400 rather than the number of beams as in the above described embodiment. Therefore, in order to provide a signal from any beam to a selected sector input of call processing equipment 400, signals from each of the N beams are provided to switch matrixes associated with each sector input; illustrated here as switch matrixes $610a_1$ through $610m_2$. It shall be appreciated that the use of such switch matrixes may be utilized to provide signals from any beam to multiple sector inputs simultaneously and, thus, provide overlapping coverage by the various sectors as is discussed herein below.

As in the embodiment discussed above, the switch matrixes of this embodiment are controlled by a control signal provided each switch matrix by sector controller 460. It shall be understood that, although a single control interface is illustrated between all of the switch matrixes, that each of these switch matrixes is controlled independently by controller 460. Of course, sector controller 460 need not be a discrete component associated with the cell site, but may instead be an integral part of the cell's existing control circuitry. Moreover, sector controller 460 may be included as a part of a centralized control system, utilized to control a network of neighboring cell sites, rather than being embodied within the particular cell site it is associated with.

As with the above discussed embodiment, sector controller 460 may comprise a CPU and RAM to control the sectors according to the present invention, such as through the use of an algorithm basing switching decisions on past or projected utilization patterns or an algorithm basing such decisions on current utilization as determined from this cell or a neighborhood of cells. Current utilization information may be determined by controller 460 or may be provided by the cell's existing control circuitry. Sector controller 460 may also be provided with current utilization information from a centralized apparatus (not shown) controlling a plurality of neighboring cells. As discussed in detail above, this current utilization information may include such information as the number of users associated with particular sectors or cells, the number of available channels, or other resources, of particular sectors or cells, or the signal quality associated with particular sectors, cells or users.

It shall be appreciated, in order to determine which of the strongest beams with respect to the signal of interest, that signal strength detection means is necessary. Referring to FIG. 6, signal detector 660 is provided to determine the beams having the strongest received signal strength with respect to the signal of interest. To provide each of the beam signals to signal detector 660, switch matrix 670 is provided. It shall be appreciated that switch matrix 670 allows signal detector 660 to sample the signal associated with each beam of the antenna system, although not simultaneously. Typically, such sampling is acceptable to determine the beams having the strongest signal strength of a particular signal. Of course, where such sampling is not acceptable, additional circuitry could be utilized providing simultaneous signal detection on each of the beams, if desired.

Information regarding the beams having the strongest receive signal is provided to sector controller 460 through the interface between the sector controller and signal detector 660. It shall be appreciated that such information may be utilized by sector controller 460 to adjust switch matrixes 610$a_1$ through 610$m_2$ such that these beams may be switched to the proper sector inputs as described above. It shall be understood that, although a single control interface is illustrated between all of the switch matrixes, each of these switch matrixes may be controlled independently by controller 460.

As the scanning receiver scans for a particular voice channel (the signal of interest), as indicated by a message from the cell site controller, the signal detector may intercept this information in order to provide the sector controller with information regarding the signal of interest. For example, information regarding the signal of interest may be provided to the signal detector through a link with the cell site controller (not shown). The signal detector may then sample signals from each beam in order to determine the beam having the strongest signal with respect to this signal of interest.

Similarly, where the call setup radio utilizes different signaling channels per sector, information regarding the signaling channel of interest may be provided to the signal detector through a link with the cell site controller (not shown). The signal detector may then sample signals from each beam in order to determine the beam having the strongest signal with respect to this signal. Of course, where sampling individual channels is not acceptable, additional circuitry could be utilized providing simultaneous signal detection on multiple channels, if desired.

It shall be appreciated that, as discussed above, communication within a particular sector of a cell of a cellular system is not only a function of other communications within that sector or even other sectors of that cell, but may also be affected by communications within neighboring cells. Therefore, this embodiment of the present invention includes means by which to adjust the sector's effective outboard reach or length, as referenced in the direction of propagation of the radiation. It shall be appreciated that reduction of the longitudinal size of the sector thereby decreases the amount of interference sent into adjacent cells as communication devices operating within the adjusted sector are limited in the distance from the center of the cell that they may operate. As a result, the adjacent cells may open up their sectors into larger areas to serve more customers. Thus, a system of cells utilizing the present invention may be used to provide increased signal quality as well as increased capacity without increasing the number channels available at each cell.

The above mentioned sector outboard shaping is preferably accomplished through adjusting attenuators 650$a_1$ through 650$m_2$ provided in the signal paths between the switch matrixes and the call processing equipment sector inputs. These attenuators may be utilized to adjust the power of a received signal prior to its input into the call processing equipment. As described above with respect to the switch matrixes, each of the attenuators may be individually controlled by controller 460. Therefore, the call processing equipment may be convinced that a particular signal is being received at a lower strength than is actually being received. As such, the call processing equipment can be artificially manipulated to either cause an in sector hand off or a hand off to another cell.

It shall be appreciated, although outboard shaping may be accomplished through the use of attenuators with either of the above described embodiments, that the alternative embodiment illustrated in FIG. 6 utilizes a number of such attenuators equal to the sector inputs of call processing equipment 400. Such an arrangement of attenuators allows the sector controller to adjust a signal strength of the signal of interest independently at any or all of the sector inputs.

However, in order to independently adjust a signal strength of the signal of interest independently at each of the sector inputs with the embodiment illustrated in FIG. 4, the number of attenuators must equal the number of beams times the number of sector inputs. This is because if fewer attenuators were used, such as by placing them between the beam signal source and the splitter/switch matrixes 410$a$ through 410$n$ or between combiners 450$a_1$ through 450$m_2$ and the sector inputs, the signal strength for multiple sector inputs or for multiple beams would be adjusted rather than their being independently adjusted. The former would result in all signals received on a particular beam being adjusted similarly regardless of the sector input it is to be input into. The latter would result in all signals input into a sector input being adjusted similarly regardless of the beam from which it originated.

In contrast, independent adjusting of the signals through the use of fewer attenuators is accomplished by the embodiment illustrated in FIG. 6 by utilizing the additional information with respect to the signal of interest. Here, concurrent with the call processing equipment scanning a particular signal, the proper beams receiving that signal can be switched to the desired sector input as well as the attenuators adjusted accordingly. Thereafter, when the call processing equipment scans another particular signal, the beams receiving this signal can be switched to the desired sector input and the attenuators adjusted accordingly.

It shall be appreciated that attenuation of ones of the various signals associated with the beams of the present invention effectively decreases the outboard, or longitudinal, size of the sector including that beam, thereby decreasing the size of the sector or cell. For example, increasing the amount of the attenuation of an attenuator associated with a particular beam, which translates into a reduction in signal strength of that beam, which beam's signal is routed to a particular input port of the call processing equipment results in the reduction of the range of this antenna beam of the system as seen at the input port of the call processing equipment. Where the sector is split into a 60° system, as described above, for example, the signals on the two antenna beams could be attenuated by a select amount of and, thus, reduce the range of this particular sector of the cell to a predetermined length.

The above mentioned forced hand off of users of a particular sector/cell by attenuating the signal received from the user may be advantageous where the handed off user, or other user of the cell, has an interference problem, such as might be caused by co-channel interference or an undesirable carrier to noise ratio. The forced hand off of a particular user could be utilized to improve signal quality by providing the user with a better signal from another sector/cell.

For example, where there is interference as a result of using certain channels on the two beams comprising the above discussed 60° sector, by utilizing attenuators in the signal path an effective reduction in the size of that specific sector could be accomplished. As a result of the reduced effective sector size, subscriber units in the sector would be handed off to be serviced by an adjacent sector or cell, thereby reducing the interference that this sector is causing other users.

Figure 5:
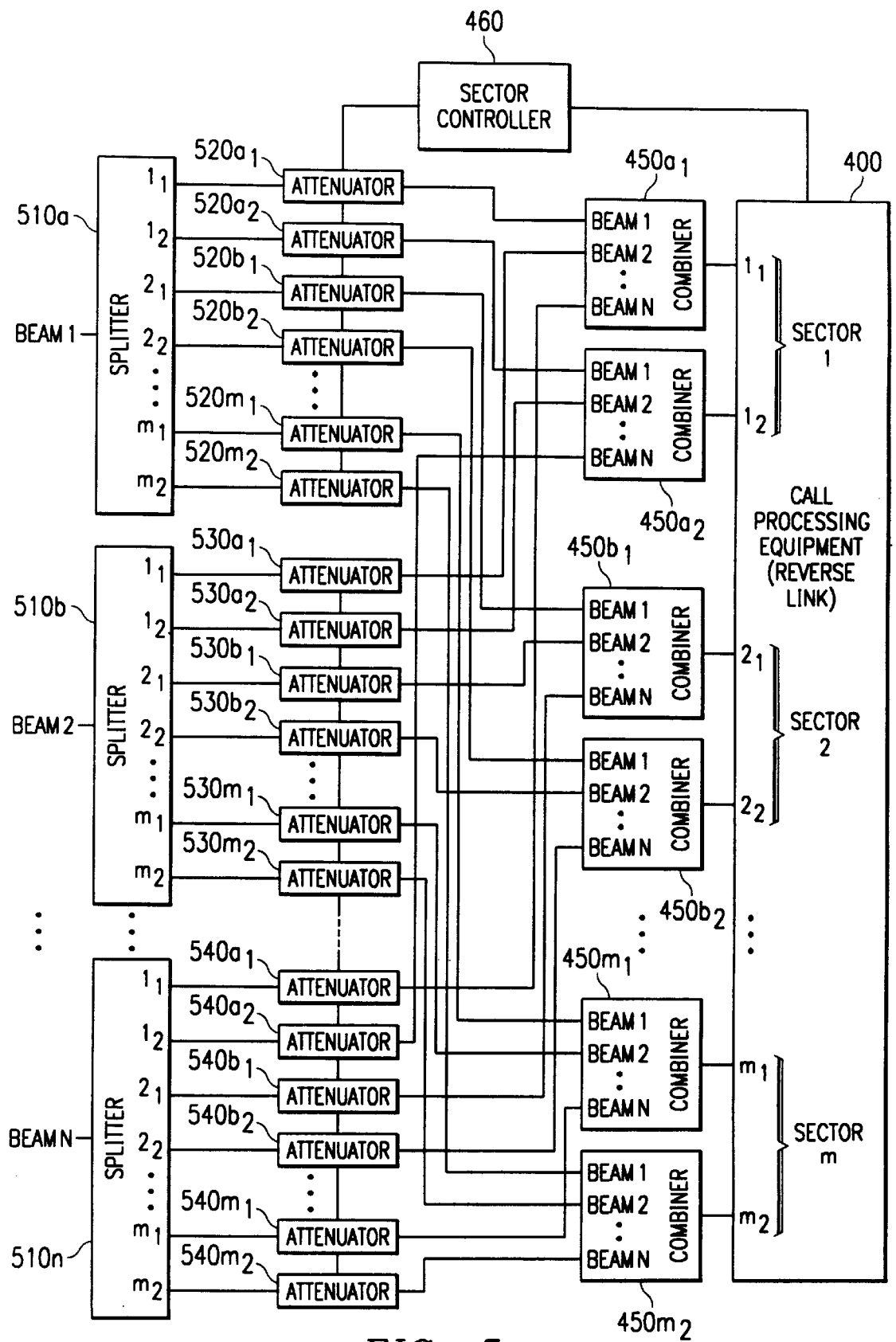
FIG. 5 illustrates a block diagram of a communication system wherein signals associated with multiple beams may be dynamically attenuated and combined to provide selectable sector sizing according to the present invention.

Recognizing that interruption in a signal path may be accomplished by an attenuator adjusted to provide impedance approaching infinity, or an open circuit, an alternative preferred embodiment of the present invention utilizes attenuators exclusive of switch matrixes, as is illustrated in FIG. 5. Of course, as previously discussed, attenuators can be utilized within the signal paths of the switches of FIGS. 4 or 6 to provide signal attenuation in addition to signal switching, if desired.

Referring to FIG. 5, it can be seen that signals associated with the various beams are provided call processing equipment 400 through the signal combiners $450a_1$ through $450m_2$ as in the embodiment illustrated in FIG. 4. However, the splitter/switch matrix of the previously discussed embodiment have been replaced with splitters 510a through 510n in combination with attenuators $520a_1$ through $520m_2$, $530a_1$ through $530m_2$, and $540a_1$ through $540m_2$. Of course, the splitters and associated attenuator sets may be combined into a single apparatus, much like the splitter/switch matrixes of FIG. 4, if desired.

Referring again to FIG. 5, a control signal is provided each attenuator by sector controller 460. It shall be appreciated, although a single control interface is illustrated between controller 460 and the attenuators of this embodiment, that each of the attenuators may be independently adjusted by sector controller 460. As in the above described embodiment, sector controller 460 need not be a discrete component associated with the cell site, but may instead be an integral part of the cell's existing control circuitry. Similarly, sector controller 460 may be included as a part of a centralized control system, utilized to control a network of neighboring cell sites, rather than being embodied within the particular cell site it is associated with.

As previously mentioned, sector controller 460 may comprise a CPU and RAM. This RAM may have stored therein an algorithm operable to cause the CPU to adjust the attenuators of the present invention to increase their impedance to approach infinity, to result in a discontinuation of a particular signal path, or to decrease impedance, to result in variously attenuated signal paths ("switching"). It shall be appreciated that such adjustment results in the switching of the signals of the various beans, at various power levels, to predetermined ones of the sector inputs. Such switching may be at various times of the day or week as was the case in the aforementioned embodiment.

Switching by such an algorithm may be based on past or projected utilization patterns and incorporate no information on the actual utilization pattern of the cell. Alternatively, in a preferred embodiment, sector controller 460 includes current utilization information input such as may be determined by controller 460 or may be provided by the cell's existing control circuitry. This current utilization information may include such information as the number of users associated with particular sectors, the number of available channels, or other resources, of particular sectors, and the signal quality associated with particular sectors or particular users within the sectors. From this information, sector controller 460 may adjust the attenuators of the present invention to provide alternative sector sizing, either by establishing/discontinuing a signal path associated with a particular beam to a particular sector input or by increasing/reducing the effective longitudinal size of beams of a particular sector, and thus increase the number of channels, or other resources, available to a particular area within the cell, or improve signal quality associated with a sector or user.

Additionally, or in the alternative, sector controller 460 may be provided with current utilization information of a plurality of neighboring cells from a centralized apparatus as described above. Such a centralized apparatus may be provided information from each of the neighboring cells in order to make decisions as to the allocation of the various resources of the system, such as the re-use of channels at neighboring cells, the handing off of users between the cells, and the sizing of sectors at neighboring cells to provide increased capacity or signal quality.

Figure 7:
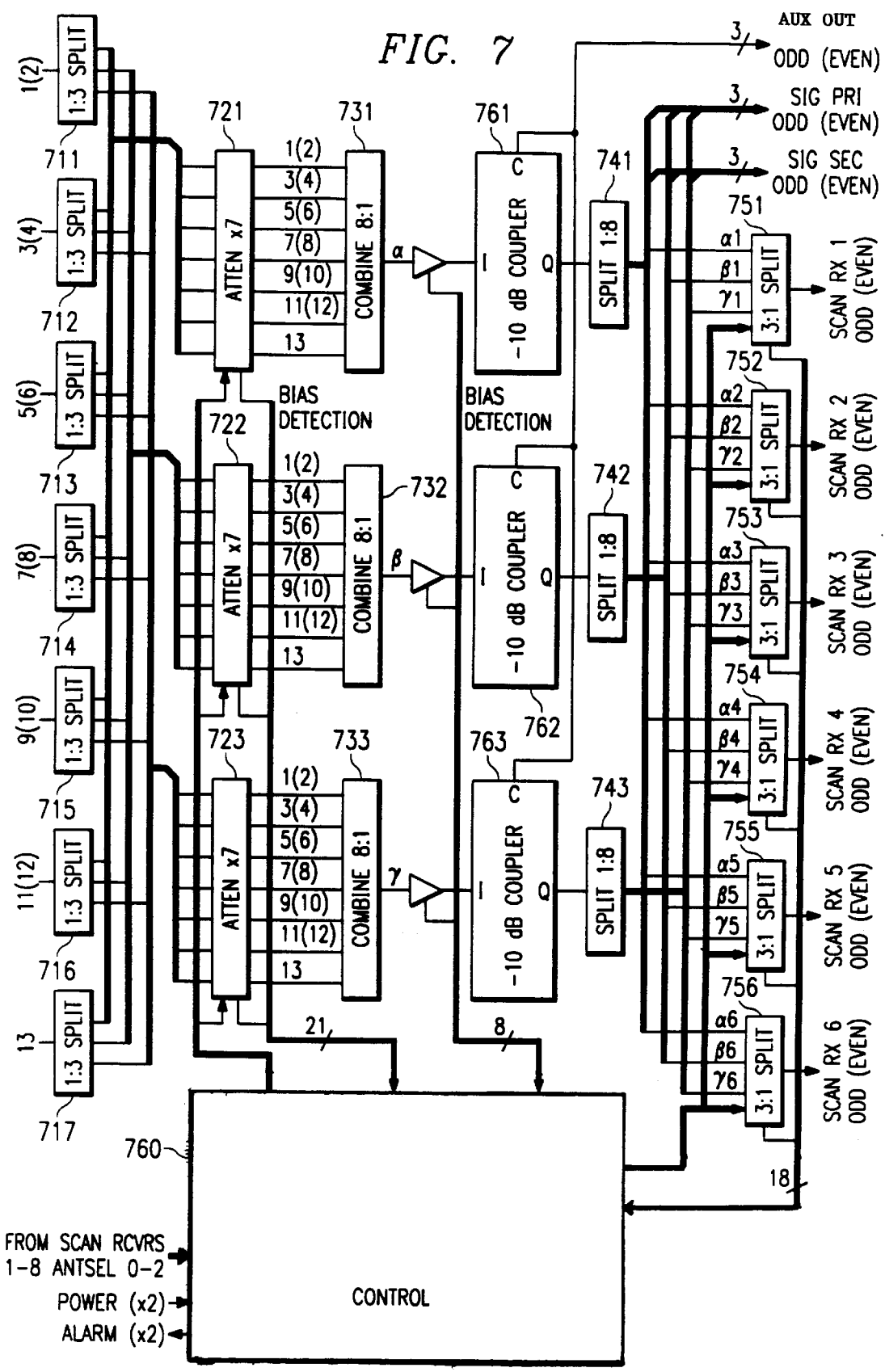
FIG. 7 illustrates a block diagram of a preferred embodiment of a communication system wherein particular signals of interest may be dynamically routed and attenuated to provide selectable sector sizing according to the present invention.

Directing attention to FIG. 7, a preferred embodiment of the present invention is illustrated suitable for providing the signals of the antenna beams to the call setup radio and scanning receivers of a base transceiver station. This embodiment will be referred to herein as the sig/scan interface (SSI) although it should be appreciated that the circuitry of FIG. 7 is useful in providing signals to call processing equipment in addition to or other than call setup radios and scan receiving of a base transceiver station.

The SSI of FIG. 7 is adapted to interface the above described twelve antenna beams to signaling transceivers (not shown, but coupled to outputs of splitters 741–743), six scanning receivers (not shown, but coupled to other ones of the outputs of splitters 741–743), and an auxiliary output (coupled via −10 dB couplers 761–763). This preferred embodiment of the present invention provides the flexibility to assign any beam to any sector, with any weighting, thus allowing highly flexible sector definitions, including the aforementioned overlapping sectors. Although showing particular numbers of antenna beams, signaling transceiver inputs, and scanning receivers, it shall be appreciated that the present invention may be sealed for any number of each.

As described above, this embodiment of the present invention also includes splitters and combiners in order to couple the antenna beam signals to various sector ports. Specifically, splitters 711–717 are provided to split each antenna beam for coupling to any combination of three sectors (α, β, and γ sectors). Attenuators 721–723 provide individual manipulation of each antenna beam signal for each sector. Moreover, attenuators 721–723 provide the above described switching function through attenuation approaching infinity. Combiners 731–733 provide combining of the various antenna beam signals for each sector. Sector controller 760, substantially the same as sector controller 460 described above, and provides a control signal to each attenuator 721–723. Of course, sector controller 760 need not be a discrete component associated with the cell site, but may instead be an integral part of the cell's existing control circuitry. Moreover, sector controller 760 may be included as a part of a centralized control system, utilized to control a network of neighboring cell sites, rather than being embodied within the particular cell site it is associated with.

Sector controller 760 preferably uses utilization information, such as may be monitored through the illustrated connections between the attenuators and sector controller 760 or the scanning receivers and sector controller 760, in controlling communication according to the present invention. This utilization information may include such information as the number of users associated with particular sectors, the number of available channels, or other resources, of particular sectors, or the signal quality associated with particular sectors or particular users within the sectors. From this information, sector controller 760 may adjust the attenuators and switches of the present invention to provide alternative sector sizing, mapping, overlapping, orientation, etcetera and thus increase the number of channels, or other resources, available to a particular area within the cell, or improve signal quality associated with a sector or user.

Additionally, or in the alternative, sector controller 760 may be provided with current utilization information from a centralized apparatus (not shown) controlling a plurality of neighboring cells. Such a centralized apparatus may be provided information from each of the neighboring cells in order to make decisions as to the allocation of the various resources of the system, such as the re-use of channels at neighboring cells, the handing off of users between the cells, and the sizing of sectors at neighboring cells to provide increased capacity or signal quality.

In addition to the circuitry discussed above with respect to FIGS. 4, 5 and 6, the embodiment of FIG. 7 illustrates circuitry coupling antenna beam signals combined as sector signals to call setup radios and scanning receivers. Specifically, splitters 741–743 are shown providing the sector signals to each of these devices. Likewise, couplers 761–763 are shown providing sector signals to an auxiliary output.

Preferably, the SSI illustrated in FIG. 7 is utilized in pairs, where one SSI interconnects a portion of the antenna beams to the above mentioned equipment and the other SSI interconnects the remainder of the antenna beams. In the preferred embodiment each SSI creates three sector signals from six antenna beams by combining alternate beams, wherein each SSI creating one of two diversity signals for each diversity pair. This approach offers the added advantage of providing protection against failure. For example, if one SSI unit fails, the other SSI provides non-diversity functionality.

The circuitry illustrated in FIG. 7 represents either of the SSIs of the SSI pair of the preferred embodiment of the present invention, with the antenna beams of the two distinguished by the parenthetical notations. Additionally, it should be appreciated that the circuitry of FIG. 7 includes a thirteenth antenna beam heretofore not included in the examples. This antenna beam may be that associated with an antenna structure providing a filling signal, such as might be deployed within a building or tunnel, for example. Of course, the concepts of the present invention may be unitized with any number of antenna beams and, therefore, the thirteen antenna beams are for illustrative purposes only. Likewise, the circuitry of FIG. 7 is adapted to provide three sector signals to the call setup radios and scanning receivers. However, it should be appreciated that any number of sectors may be formed utilizing the present invention and the SSI illustrated in FIG. 7 may be utilized in a sectored site in order to provide the advantages of flexible sector definition and improved trunking efficiency.

As discussed above, the trunking characteristics of the present invention are dependent on the number of beams assigned to each sector. A system utilizing circuitry such as that illustrated in FIG. 7 technically has sector trunking. However, results of anything from sector to omni trunking may be achieved according to the present invention. For example, sector trunking is realized when sectors are defined without overlap, although the characteristics of this sector trunking may be adjusted by adjusting the sector sizes as described above. Omni trunking is realized when every beam is assigned to every sector.

There is a direct relationship between the size of the trunk group and the signaling and scan noise performance degradation. This relationship for the preferred embodiment described above is shown in the table below.

| Number of Beams Combined | Noise Degradation (dB) | Sig/Scan Performance Degradation (dB) |
|---|---|---|
| 2 | 3.0 | 0 |
| 3 | 4.8 | 1.8 |
| 4 | 6.0 | 3.0 |
| 5 | 7.0 | 4.0 |
| 6 | 7.8 | 4.8 |

Figure 8:
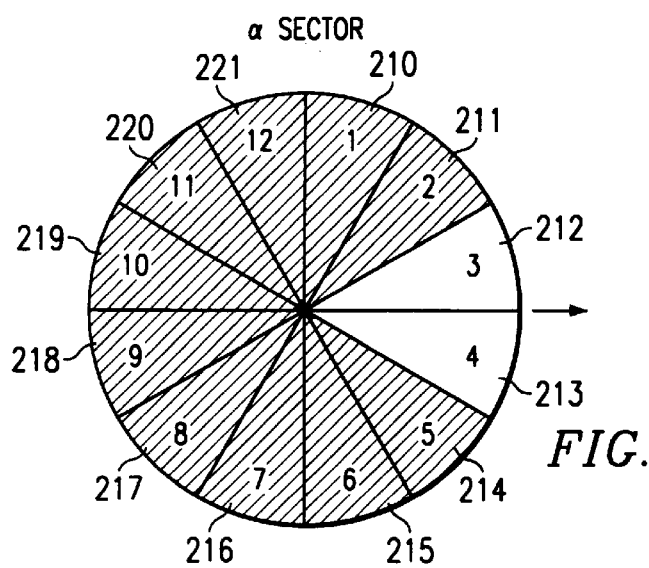
FIG. 8 illustrates combining of antenna beams to form a near-omni sector according to the present invention.

An advantage of the present invention is that near omni trunking may be employed to improve trunking efficiency while reducing the signaling and scan noise performance degradation over that of an omni trunk. For example, all but one or two antenna beams may be combined into a sector, i.e., beams 210, 211, and 214–221 of FIG. 2 combined to form an a sector as illustrated in FIG. 8. Here antenna beams 212 and 213 are excluded from the alpha sector and, accordingly, the frequencies used in the α sector may be reused by another cell in the direction of the arrow. Moreover, as less than all the antenna beams are combined to form the sector, the signaling and scan performance degradation is less than that of an omni trunk. However, where the α sector of FIG. 8 overlaps a β sector and/or a γ sector, trunking efficiency approaches that of an omni site.

It should be appreciated that the a sector of FIG. 8 may be formed by a pair of SSIs such as that illustrated in FIG. 7.

A first SSI (odd) combines beams 1, 5, 7, 9 and 11 and couples them to one a sector diversity port while a second SSI (even) combines beams 2, 6, 8, 10 and 12 and couples them to another α sector diversity port.

It shall be appreciated that, although particular sector sizing accomplished by mapping particular antenna beams to sector inputs have been discussed in the above examples, such sector sizing is purely in the way of example and is in no way intended to be a limitation of the present invention. Any number of beams may be composited into sectors according to the present invention. For example, the present invention could be utilized to provide a single 60° sector concurrent with two 150° sectors. Likewise, the present invention is equally suited to provide homogeneous sectors, such as the three 120° sectors of the prior art systems.

Additionally, as discussed above, it is also possible, according to the present invention, to provide all of the beams to each sector input to essentially provide an omni cell site. For example, in the twelve beam system described herein, signals from all twelve beams would be provided to inputs associated with each sector of the call processing equipment. Here, instead of having 120° per sector as in the prior art, each sector covers a full 360°, or using the above described two input call processing equipment, 180° per each sector input For example, using every other beam for input number 1 and every other beam for input number 2 associated with a first sector, this first sector now covers a full 360° ° about the cell site. Similarly, the two inputs associated with the remaining sectors may be provided signals from each beam. This results in each sector having 360° azimuthal coverage in the back tune configuration and, therefore, each channel, regardless of the sector with which it is associated, being available throughout the cell.

Although the use of alternating adjacent beams has been discussed with respect to the two inputs associated with a particular sector of the call processing equipment, it shall be appreciated that the present invention is not limited to such an input arrangement. Signals from adjacent beams may be combined by a signal combiner to the same input of a sector input pair according to the present invention.

However, it shall be appreciated that inputting adjacent beam signals to alternate inputs of a sector input pair is preferred so as to provide a better quality signal by increasing signal diversity between the signals input to each input of the sector input pair. Through the angular diversity associated with the collocated beam sources disposed to "see" different wave fronts, adjacent beam signals provided to alternate inputs of a sector input pair may provide signal diversity where adjacent beam signals provided to the same inputs of a sector input pair may not. For example, where a subscriber unit is located such that its signal is received only within two adjacent beams of a four beam sector, provision of these two adjacent beam signals to a single sector input would not provide signal diversity whereas alternating input of adjacent beams to the sector input pair of the call processing equipment would provide signal diversity.

Furthermore, it shall be appreciated that, although a three sector system has been discussed, the present invention is not limited to the provision of three sectors. The present invention may provide sector sizing of any number of sectors controllable by the associated call processing equipment. For example, the present invention may provide two sectors rather than the three discussed. Similarly, the present invention may provide a number of sectors in excess of the three sectors described in a preferred embodiment, such as is represented by the M sectors of call processing equipment 400.

Similarly, it shall be understood that the present invention is not limited to the provision of two signals per sector input. By using various arrangements of the aforementioned switch matrixes and/or attenuators in combination with signal combiners (if needed), the present invention may provide a number of signals associated with particular beams to any number of sector inputs.

Furthermore, it shall be understood that the present invention is not limited to utilization of a twelve beam system as described herein. Any number of beams may be utilized to provide the sizable sectors of the present invention. Of course, where the number of beams utilized is different than discussed above, the individual beam width may be greater or less than the 30° beam width used in the above examples. Therefore, it shall be appreciated that use of a different number of beams may result in a different minimum sector width as a result of combining such beams.

Moreover, it shall be appreciated that the use of equally sized beams is not a limitation of the present invention. Beams of different azimuthal width may be utilized to provide the sizable sectors of the present invention. For example, where a particular area within a cell is likely to be utilized by only a limited number of users, such as where the cell overlays a mountainous region causing signal shadows or where the cell includes other areas of limited user access, i.e., an ocean, a few beams may be sized to substantially cover this area so as not to necessitate the provision of a number of beams for a very few possible users.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing increased trunking efficiency in a sectored communication system having a radiation pattern associated with a communication device, wherein the communication device includes a plurality of inputs ones of which are associated with a particular sector of said sectored communication system, said system comprising:

means for providing a plurality of predefined antenna beams composited to form said radiation pattern, each beam having a discrete signal associated therewith suitable for input into said inputs of said communication device;

means for coupling select ones of the discrete signals to particular ones of the plurality of inputs, wherein a first sector of said plurality of sectors is at least in part defined as a function of a particular one of said discrete signals coupled to a first input of said communication device, and wherein a second sector of said plurality of sectors is at least in part defined as a function of said particular one of said discrete signals coupled to a second input of said communication device; and means for assigning one of said first sector and said second sector to a subscriber unit operating within an antenna beam associated with said particular one of said discrete signals.

2. The system of claim 1, wherein said assigning means comprises:

means for assigning the sector of said first sector and said second sector having a best quality receive signal associated with said subscriber unit.

3. The system of claim 1, wherein said assigning means comprises:

means for first arbitrarily assigning either of said first sector or said second sector to said subscriber unit; and means for assigning the other of said first sector or said second sector if the first assigned one of said sectors is unable to service said subscriber unit.

4. The system of claim 1, wherein a third sector of said plurality of sectors is at least in part defined as a function of said particular one of said discrete signals coupled to a third input of said communication device.

5. The system of claim 4, wherein said assigning means comprises:

means for first arbitrarily assigning any one of said first sector or said second sector or said third sector to said subscriber unit;

means for second arbitrarily assigning any one of the other of said first sector or said second sector or said third sector if the first assigned one of said sectors is unable to service said subscriber unit; and means for assigning the other of said first sector or said second sector or said third sector if the first assigned one of said sectors and the second assigned one of said sectors is unable to service said subscriber unit.

6. The system of claim 1, further comprising:

means for selecting said particular one of said discrete signals as a function of a communication parameter.

7. The system of claim 6, wherein said communication parameter comprises information determined by said system.

8. The system of claim 6, wherein said communication parameter comprises information provided by a centralized controller operating to control a plurality of cooperating communication devices.

9. The system of claim 1, wherein said first sector is at least in part defined as a function of first ones of said discrete signals other than said particular one of said discrete signals coupled to said first input of said communication device, and wherein said second sector is at least in part defined as a function of second ones of said discrete signals other than said particular one of said discrete signals coupled to said second input of said communication device, wherein said first other ones of said discrete signals includes at least one of discrete signal not included in said second other ones of said discrete signals.

10. The system of claim 1, wherein said means for coupling comprises:

means for periodically altering said ones of said discrete signals coupled to said first and said second input of said communication device.

11. The system of claim 1, wherein said communication device comprises cell site call processing equipment.

12. The system of claim 11, wherein said communication device comprises a call setup radio and a scanning receiver.

13. A method for providing increased trunking efficiency in a sectored communication system having a radiation pattern associated with a communication device, wherein the communication device includes a plurality of ports ones of which are associated with a particular sector of said sectored communication system, said method comprising the steps of:

providing a plurality of predefined antenna beams composited to form said radiation pattern, each beam having a discrete signal associated therewith suitable for coupling to said ports of said communication device;

coupling select ones of the discrete signals to particular ones of the plurality of ports, wherein a first sector of said plurality of sectors is at least in part defined as a function of a particular one of said discrete signals coupled to a first port of said communication device, and wherein a second sector of said plurality of sectors is at least in part defined as a function of said particular one of said discrete signals coupled to a second port of said communication device; and assigning one of said first sector and said second sector to a subscriber unit operating within an antenna beam associated with said particular one of said discrete signals.

14. The method of claim 13, wherein said assigning step comprises the step of:

assigning the sector of said first sector and said second sector having a best quality receive signal associated with said subscriber unit.

15. The method of claim 13, wherein said assigning step comprises the steps of:

first arbitrarily assigning either of said first sector or said second sector to said subscriber unit; and assigning the other of said first sector or said second sector if the first assigned one of said sectors is unable to service said subscriber unit.

16. The method of claim 13, wherein a third sector of said plurality of sectors is at least in part defined as a function of said particular one of said discrete signals coupled to a third port of said communication device.

17. The method of claim 16, wherein said assigning step comprises the steps of:

first arbitrarily assigning any one of said first sector or said second sector or said third sector to said subscriber unit;

second arbitrarily assigning any one of the other of said first sector or said second sector or said third sector if the first assigned one of said sectors is unable to service said subscriber unit; and assigning the other of said first sector or said second sector or said third sector if the first assigned one of said sectors and the second assigned one of said sectors is unable to service said subscriber unit.

18. The method of claim 13, further comprising the step of:

selecting said particular one of said discrete signals as a function of a communication parameter.

19. The method of claim 18, wherein said communication parameter comprises information determined by said communication system.

20. The method of claim 18, wherein said communication parameter comprises information provided by a centralized controller operating to control a plurality of cooperating communication devices.

21. The method of claim 13, wherein said first sector is at least in part defined as a function of first ones of said discrete signals other than said particular one of said discrete signals coupled to said first port of said communication device, and wherein said second sector is at least in part defined as a function of second ones of said discrete signals other than said particular one of said discrete signals coupled to said second port of said communication device, wherein said first other ones of said discrete signals includes discrete signals not included in said second other ones of said discrete signals.

22. The method of claim 13, wherein said coupling comprises:

dynamically altering said ones of said discrete signals coupled to said first and said second ports of said communication device.

23. The method of claim 13, wherein ones of said plurality of ports associated with particular sectors of said sector communication system are sector signal output ports.

24. The method of claim 13, wherein ones of said plurality of ports associated with particular sectors of said sector communication system are sector signal input ports.

25. An apparatus for providing overlapping regions of a plurality of sectors of a radiation pattern composed of a plurality of predefined narrow beams each associated with at least one discrete signal, wherein each of said sectors is associated with ones of a plurality of ports, said apparatus comprising:

signal splitter circuitry adapted to split said discrete signals into multiple split signals suitable for simultaneous provision of split signals having a same signal content to ones of said plurality of ports; and attenuator circuitry adapted to pass ones of said split signals to predetermined combinations of said plurality of ports, wherein said attenuator circuitry passes at least two split signals having a same signal content to ports of said plurality of ports associated with different sectors.

26. The apparatus of claim 25, wherein ones of said ports are associated with a mobile signal quality measuring device.

27. The apparatus of claim 25, wherein ones of said ports are associated with an apparatus for determining which sector to assign a mobile to upon call origination.

28. The apparatus of claim 25, further comprising:

signal combiner circuitry adapted to combine ones of said split signals passed by said attenuator circuitry into sector signals for coupling at least one sector signal including split signals having a different signal content to a port of said plurality of ports associated with a first sector.

29. The apparatus of claim 28, wherein a size of said first sector is at least in part defined by a number of split signals having a different signal content included in said sector signal.

30. The apparatus of claim 29, wherein said size of said first sector is dynamically adjustable.

31. The apparatus of claim 30, further comprising:

a processor-based controller providing a control signal to said attenuator circuitry, said control signal operable to cause said attenuators to substantially automatically adjust a size of ones said plurality of sectors by selectively coupling ones of said split signals to ones of said plurality of ports.

32. The apparatus of claim 31, wherein said processor-based controller provides said control signal as a function of current communication information determined by said apparatus.

33. The apparatus of claim 31, wherein said processor-based controller provides said control signal as a function of a signal provided said processor-based controller by a centralized controller operating to control a plurality of communication devices.

34. The apparatus of claim 28, further comprising:

signal splitter circuitry coupled to said signal combiner circuitry splitting said sector signals for coupling to multiple ones of said plurality of ports.

35. The apparatus of claim 34, wherein said multiple ones of said plurality of ports includes at least a port of a call setup radio and a port of a scanning receiver.

36. The apparatus of claim 35, further comprising:

signal switching circuitry disposed between said last mentioned signal splitter circuitry and said port of a signal quality measuring device, wherein said signal switching circuitry may be operated to provide any one of a plurality of sector signals to said port of signal quality measuring device.

\* \* \* \* \*